United States Patent
Usui et al.

(10) Patent No.: US 9,331,752 B2
(45) Date of Patent: May 3, 2016

(54) MEMORY INCLUDING WIRELESS COMMUNICATION CAPABILITY

(71) Applicant: FUJITSU LIMITED, Kawasaki-shi, Kanagawa (JP)

(72) Inventors: Daisuke Usui, Kawasaki (JP); Makoto Suwada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/328,039

(22) Filed: Jul. 10, 2014

(65) Prior Publication Data

US 2015/0087229 A1    Mar. 26, 2015

(30) Foreign Application Priority Data

Sep. 26, 2013 (JP) ................................ 2013-200362

(51) Int. Cl.
*H04B 5/00*    (2006.01)

(52) U.S. Cl.
CPC ............ *H04B 5/0075* (2013.01); *H04B 5/0031* (2013.01)

(58) Field of Classification Search
CPC ........................... H04B 5/0031; H04B 5/0075
See application file for complete search history.

(56) References Cited

U.S. PATENT DOCUMENTS

| | | | | |
|---|---|---|---|---|
| 5,070,500 A | * | 12/1991 | Horinouchi et al. | 365/189.02 |
| 6,147,604 A | * | 11/2000 | Wiklof et al. | 340/572.1 |
| 2009/0196388 A1 | * | 8/2009 | Fukaishi et al. | 375/360 |
| 2010/0278538 A1 | * | 11/2010 | Guidotti et al. | 398/115 |
| 2011/0039493 A1 | * | 2/2011 | Kuroda | 455/41.1 |
| 2012/0203954 A1 | * | 8/2012 | Sun et al. | 711/103 |
| 2012/0217658 A1 | * | 8/2012 | Kuroda | 257/777 |
| 2013/0272284 A1 | * | 10/2013 | Tsumagari et al. | 370/338 |

FOREIGN PATENT DOCUMENTS

JP    55-80882    6/1980

* cited by examiner

*Primary Examiner* — David Bilodeau
(74) *Attorney, Agent, or Firm* — Staas & Halsey LLP

(57) ABSTRACT

A memory includes a control layer that includes a first radio communication unit that performs radio communication and a control unit that controls the radio communication; and a memory layer that includes a second radio communication unit that performs the radio communication with the first radio communication unit and a first storage unit that stores information, the memory layer being provided on the control layer.

5 Claims, 7 Drawing Sheets

MEMORY INCLUDING WIRELESS COMMUNICATION CAPABILITY

CROSS-REFERENCE TO RELATED APPLICATION

This application is based upon and claims the benefit of priority from the prior Japanese Patent Application No. 2013-200362 filed on Sep. 26, 2013, the entire contents of which are incorporated herein by reference.

FIELD

The embodiments discussed herein are related to a memory.

BACKGROUND

There is a method of applying a rotation magnetic field in a plane of a magnetic thin film, magnetizing a soft magnetic pattern in accordance with rotation of the in-plane magnetic field successively, and transferring a cylindrical magnetic domain along a transfer path (For example, see Japanese Laid-open Patent Publication No. 55-80882).

In order to perform communication inside a memory, a structure of the memory, for example, using wire bonding, a through via, and the like is complicated.

Therefore, it is desired technology for simplifying a structure of a memory in which communication is performed.

SUMMARY

According to an aspect of the invention, a memory includes a control layer that includes a first radio communication unit that performs radio communication and a control unit that controls the radio communication; and a memory layer that includes a second radio communication unit that performs the radio communication with the first radio communication unit and a first storage unit that stores information, the memory layer being provided on the control layer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A first embodiment is described in detail with reference to drawings.

Figure 1:
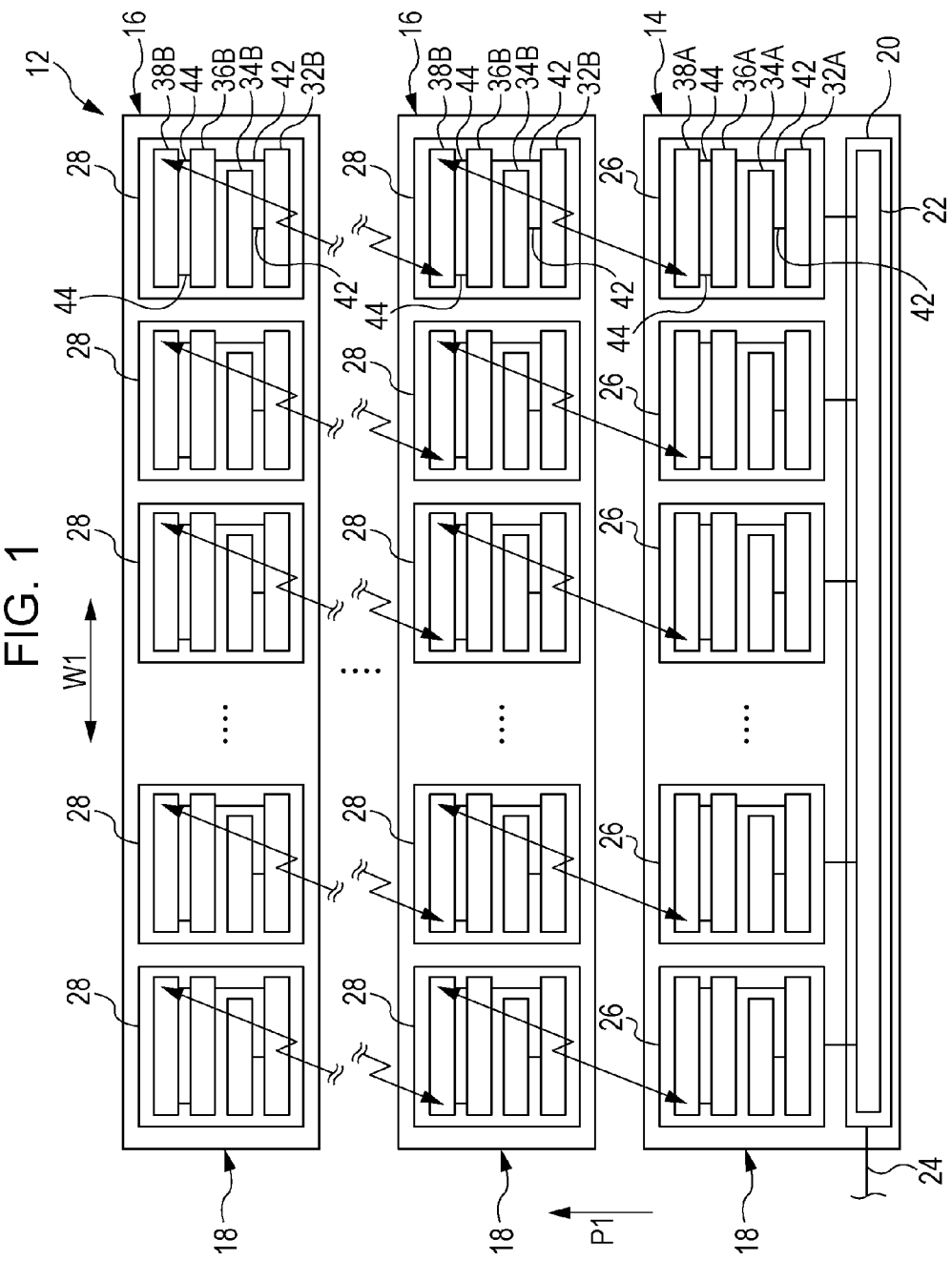
FIG. 1 is a diagram illustrating a stacked structure of a memory according to a first embodiment.

In FIG. 1, a memory 12 according to the first embodiment is illustrated. The memory 12 according to the embodiment includes a control layer 14 and a memory layer 16. In the illustrated example, a plurality of memory layers 16 are stacked on the single control layer 14.

Hereinafter, the control layer 14 and the memory layers 16 may be collectively referred to as "layers 18". In addition, the stacking direction of the memory layer 16 is simply referred to as "stacking direction", and is represented by an arrow P1. In addition, "plan view" is a view in a layer (control layer 14 and memory layer 16) stacking direction.

"Stacking" discussed herein may include a structure in which a certain member lies between layers in addition to a structure in which layers are in close contact. For example, a spacer that maintains a certain distance between the layers or an adhesive agent that binds the layers together may lie between the layers.

In the embodiment, the plurality of memory layers 16 are arranged on the same side (upper side in the example illustrated in FIG. 1) when viewed from the control layer 14.

In addition, in FIG. 1, the control layer 14 and the memory layers 16 have the same lengths in the width direction (arrow W1 direction). In addition, the control layer 14 and the memory layers 16 have the same lengths as well in the depth direction which is orthogonal to the stacking direction and the width direction. As described above, when the control layer 14 and the memory layers 16 have the same widths and depths, in a projection area of the memory 12 in the stacking direction, the control layer 14 and the memory layers 16 may be maximized.

The control layer 14 includes a control block 20 and a plurality of communication blocks 26. The control block 20 includes a memory controller 22, and controls communication in the memory 12. That is, the control block 20 is an example of a control unit. In addition, the control block 20 is electrically coupled to an external device such as an external memory and a processor, through wiring 24.

Each of the memory layers 16 includes a plurality of memory blocks 28. Hereinafter, the communication blocks 26 and the memory blocks 28 may be collectively referred to as blocks 30, as appropriate.

Figure 2:
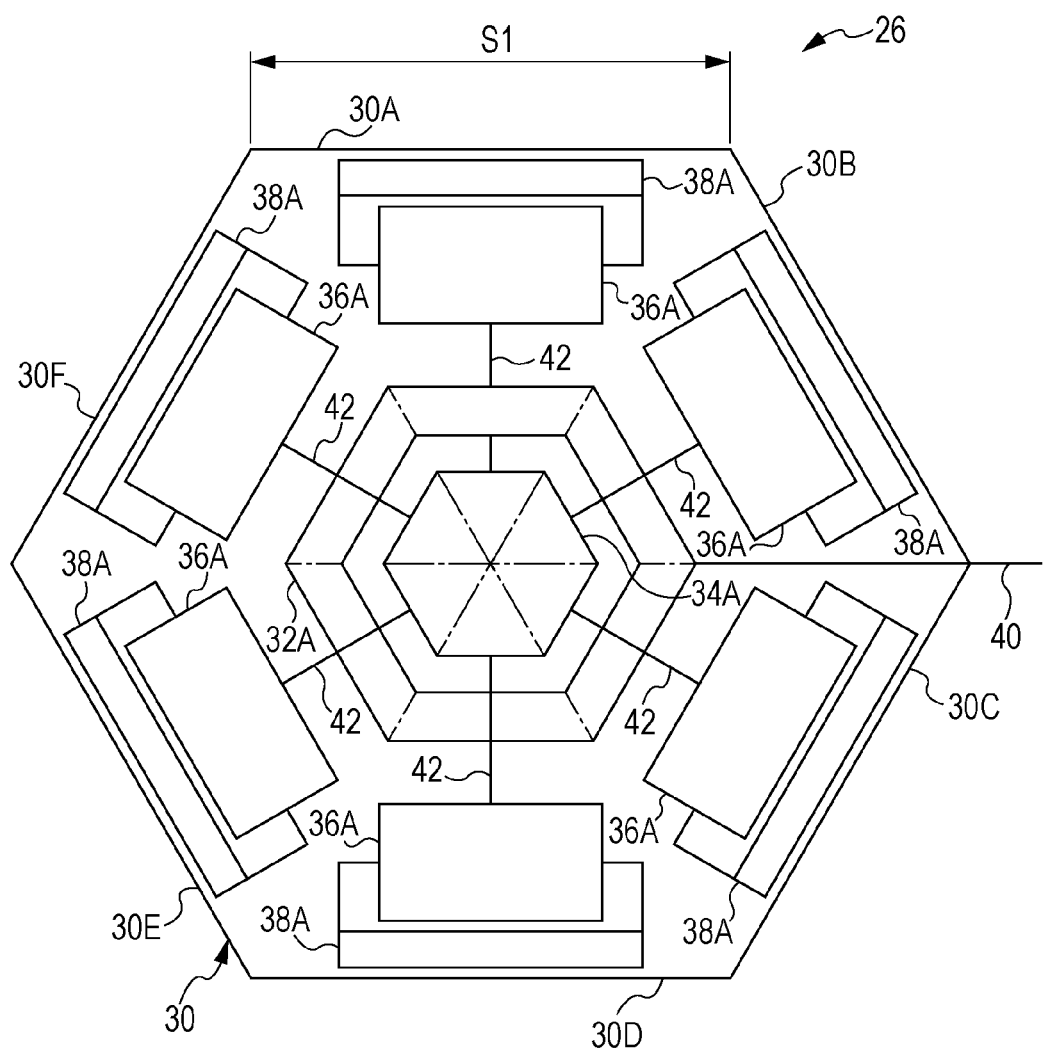
FIG. 2 is a plan view illustrating a structure of a communication block in the first embodiment.
Figure 3:
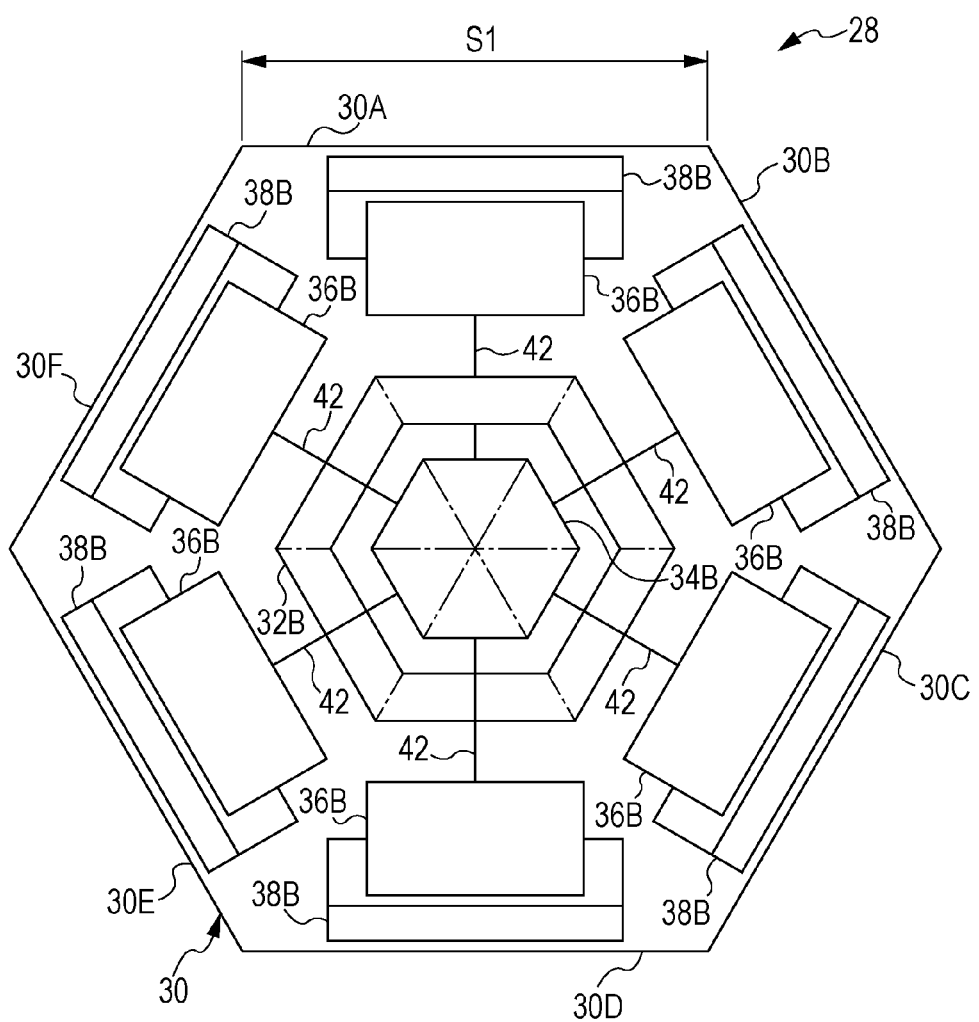
FIG. 3 is a plan view illustrating a structure of a memory block in the first embodiment.

As illustrated in FIGS. 2 and 3, each of the blocks 30 is formed into a polygon in plan view (when viewed in the stacking direction). In the examples of FIGS. 2 and 3, each of the blocks 30 is formed into an identical shape of a regular hexagonal shape in which the length of one line is "S1" in plan view.

Each of the blocks 30 includes a signal processing circuit 32, a storage area 34, current direction control circuits 36, and antennas 38. Hereinafter, "A" is applied, as a symbol, to the signal processing circuit 32, the storage area 34, the current direction control circuits 36, and the antennas 38 of the communication block 26, and "B" is applied, as a symbol, to the signal processing circuit 32, the storage area 34, the current direction control circuits 36, and the antennas 38 of the memory block 28 so that the constituent elements of the communication block 26 and the memory block 28 are distinguishable as appropriate. The current direction control circuits 36A and the antennas 38A of the communication block 26 are examples of a first radio communication unit. The current direction control circuits 36B and the antennas 38B of the memory block 28 are examples of a second radio communication unit. The storage area 34B of the memory block 28 is an example of a first storage unit. The storage area 34A of the control block 20 is an example of a second storage unit.

The storage area 34 is located in the center of the communication block 26 in plan view. The storage area 34 is an area in which information is stored.

The signal processing circuit 32 is arranged so as to surround the storage area 34 in the block 30 in plan view. For example, the signal processing circuit 32A of the communication block 26 is electrically coupled to the control block 20 through a wire 40, and transmits and receives a signal to and from the memory controller 22.

The plurality of current direction control circuits 36 and the plurality of antennas 38 are included in each of the blocks 30. In the examples illustrated in FIGS. 2 and 3, the current direction control circuits 36 and the antennas 38 are arranged so as to correspond to each line of the block 30 on a one-to-one basis around the signal processing circuit 32 in a plan view. For example, the plurality of antennas 38 are respectively arranged along lines 30A to 30F of the block 30.

The signal processing circuit 32 is electrically coupled to the current direction control circuits 36 and the storage area 34 through a wire 42, transmits and receives a signal to and from the current direction control circuits 36 and the storage area 34, and controls the current direction control circuits 36. For example, when a signal is transmitted and received between the blocks 30, the signal processing circuit 32 drives a certain current direction control circuit 36 in the block 30. In addition, when storage of information is performed, a signal is transmitted from the signal processing circuit 32 to the storage area 34 and stored in the storage area 34.

The current direction control circuits 36 are electrically coupled to the antennas 38 through a wire 44 (see FIG. 1), and generate current in a certain direction for the antennas 38 in response to a control bit from the signal processing circuit 32. The direction of the current is, for example, an arrow F1 direction or an arrow F2 direction illustrated in FIGS. 6A and 6B.

As a result, the antennas 38A of the communication block 26 and the antennas 38B of the memory block 28 may communicate with each other wirelessly. In addition, the antennas 38B of the memory block 28 and the antennas 38B of another memory block 28 may communicate with each other wirelessly. The current direction control circuits 36 may adjust a value of current that passes through the antennas 38 as appropriate.

The communication block 26 may have a structure in which there is no storage area 34A, and storage of information in the memory 12 is performed by the storage area 34B of the memory block 28.

When the block 30 is manufactured, for example, the signal processing circuit 32, the storage area 34, the current direction control circuits 36, and the antennas 38 are formed on a silicon die, and the formed elements are sliced into the communication blocks 26 or the memory blocks 28. At that time, the formed elements may be sliced into a shape (for example, the above-described hexagon) in which the antennas 38 and the current direction control circuits 36 are located along each line of the shape.

Figure 4:
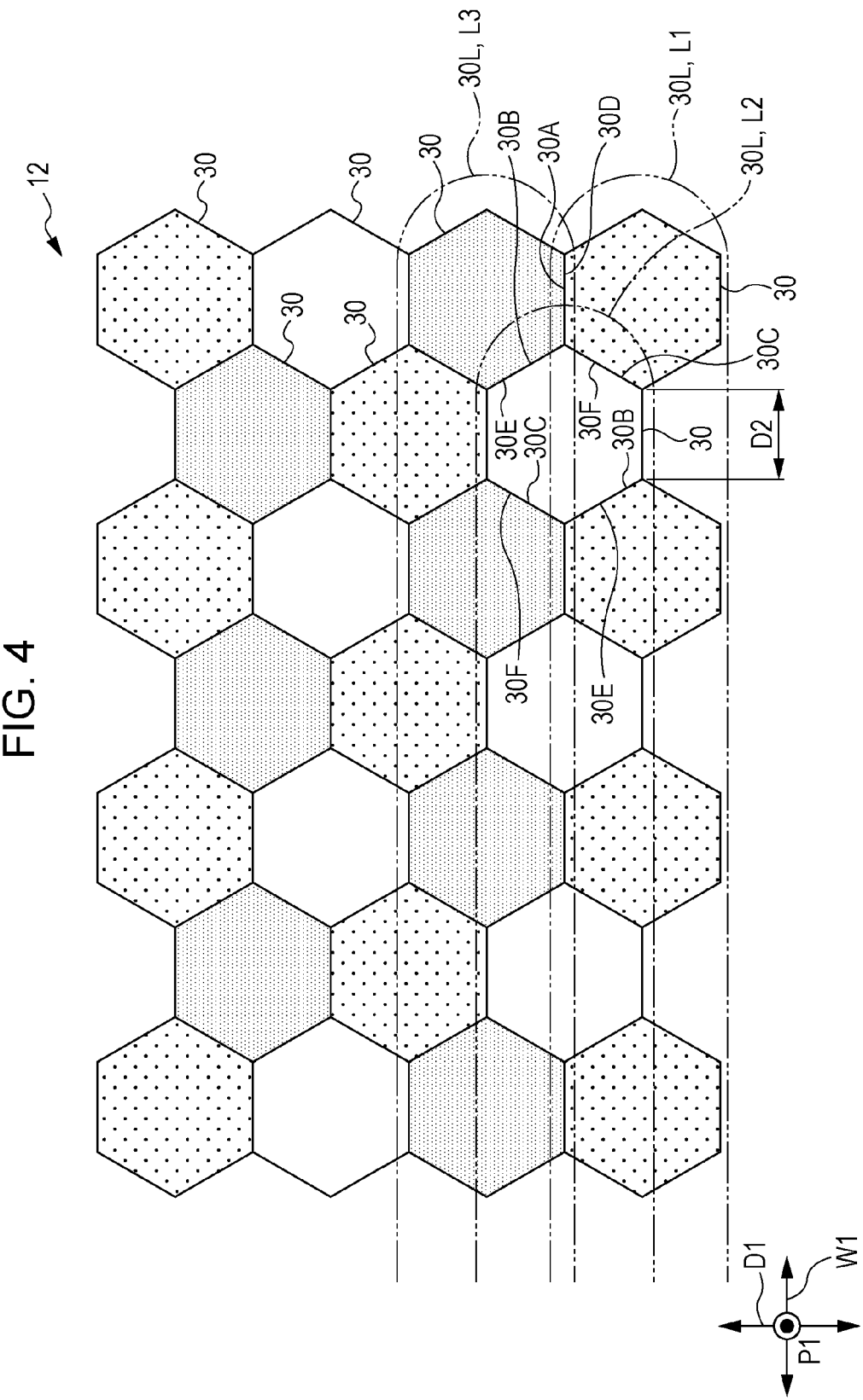
FIG. 4 is a plan view illustrating a part of three certain layers of the memory according to the first embodiment being viewed in a stacking direction.
Figure 5:
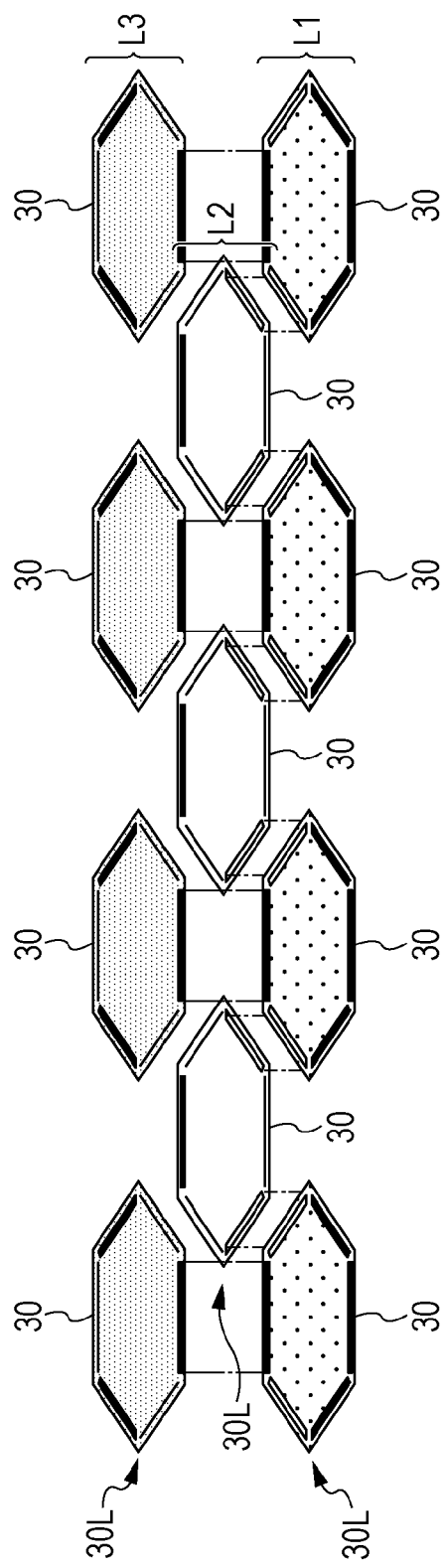
FIG. 5 is a perspective view illustrating a part of the three certain layers of the memory according to the first embodiment.

FIGS. 4 and 5 illustrate three layers 18 when the structure is viewed in the stacking direction in the memory 12. In FIGS. 4 and 5, for the sake of convenience, these three layers are distinguished as the first layer L1, the second layer L2, and the third layer L3. In practice, in a case where the number of memory layers 16 is N (here, "N" is natural number), when the number of control layers 14 is one, the memory 12 has N+1 layers in total by adding the single layer to the N layers. In particular, in the embodiment, the memory layer 16 has two or more layers. FIGS. 4 and 5 are diagrams illustrating a portion of thee certain layers that are adjacent to each other, from the memory 12 having the N+1 layers as described above. In FIGS. 4 and 5, for example, the first layer L1 may correspond to the control layer 14, and the second layer L2 and the third layer L3 may correspond to the memory layers 16, or all of the first layer L1 to the third layer L3 may correspond to the memory layers 16. The control layer 14 is not limited to a single layer. In addition, the memory layer 16 may be a single layer.

The blocks 30 in each of the layers are arranged two-dimensionally along a plane in which the stacking direction is used as a normal line. In the example illustrated in FIG. 4, the plurality of blocks 30 are arranged in a row in a certain direction that is orthogonal to the stacking direction (for example, the arrow W1 direction) at certain intervals D2. The distance D2 is equal to the length S1 of one side of the block 30 (see FIGS. 2 and 3). Hereinafter, the row of the blocks 30 may be referred to as a block row 30L.

The block row 30L is arranged in the arrow D1 direction that is orthogonal to the arrow W1. In FIG. 4, blocks 30 in a block row 30L are located between blocks 30 in the next block row 30L when viewed in the arrow D1 direction.

In addition, the layers are stacked so that a space is not generated between the blocks 30 when viewed in the stacking direction. The blocks 30 have lines that overlap when viewed in the stacking direction. For example, a line 30F of a block 30 of the first layer L1 and a line 30C of a block 30 of the second layer L2 overlap when viewed in the stacking direction. A line 30B of the block 30 of the first layer L1 and a line 30E of a block 30 of the second layer L2 also overlap when viewed in the stacking direction. In addition, a line 30B of a block 30 of the second layer L2 and a line 30E of the block 30 of the third layer L3 also overlap when viewed in the stacking direction. A line 30F of a block 30 of the second layer L2 and a line 30C of the block 30 of the third layer L3 also overlap when viewed in the stacking direction. In addition, a line 30A of the block 30 of the first layer L1 and a line 30D of the block 30 of the third layer L3 also overlap when viewed in the stacking direction.

An effect of the embodiment is described below.

In the embodiment, the communication blocks 26 of the control layer 14 include the antennas 38, and the memory blocks 28 of the memory layer 16 also include the antennas 38. Thus, as illustrated by arrows C1 and C2 in FIG. 7, the communication blocks 26 and the memory blocks 28 communicate with each other wirelessly. In addition, as illustrated by arrows C3 and C4 in FIG. 7, the memory blocks 28 also communicate with each other wirelessly. There may be employed a structure in which wire bonding, a through via, and the like, which are used to perform communication, are not included (or reduced) in the memory 12, and as a result, the structure of the memory 12 may be simplified.

For example, even when the communication blocks 26 and the memory blocks 28 communicate with each other wirelessly, and the memory blocks 28 communicate with each other through wires, the structure may be simplified as compared with a structure in which the whole communication in the memory is performed through wires. Similarly, even when the memory blocks 28 communicate with each other wirelessly, and the communication blocks 26 and the memory blocks 28 communicate with each other through wires, the structure may be simplified as compared with the structure in which the whole communication in the memory is performed through wires. In the embodiment, both communication between the communication blocks 26 and the memory blocks 28 and communication between the memory blocks 28 are performed wirelessly, so that the structure of the memory 12 may further be simplified.

Figure 7:
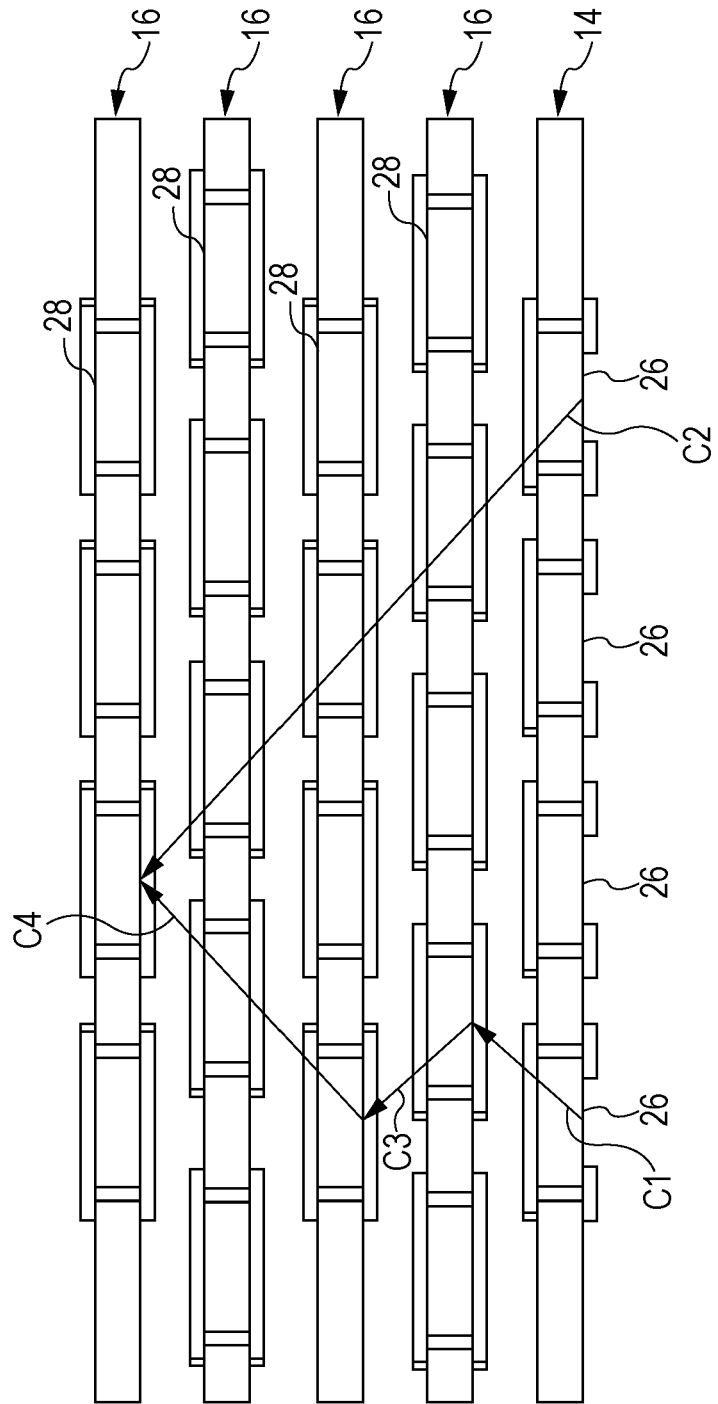
FIG. 7 is a diagram illustrating a state of communication between layers in the memory according to the first embodiment.

For example, in the memory 12 according to the embodiment, as illustrated in FIG. 7, radio communication between the blocks 30 may be performed in the diagonal directions in addition to the stacking direction.

In the embodiment, control of transmission and reception of a signal in the memory 12 is performed by the memory controller 22 of the control block 20, and transmission and reception of a signal between the memory 12 and an external device is performed through the wiring 24. As described above, control of transmission and reception of a signal within the memory 12 is completed only using the memory 12, so that transmission and reception of a signal within the memory 12 may be speeded up. For example, reacting to the speeding-up of external equipment (processors and the like) helps the speeding-up of the transmission and reception of a signal within the memory 12.

Generally, the memory layer 16 may be a single layer, but in the embodiment, a plurality of memory layers 16 are provided, so that more information may be stored in the memory.

In the structure in which the plurality of memory layers 16 are provided, for example, the memory layers 16 may be located at both sides of the control layer 14. In the embodiment, the plurality of memory layers 16 are located at the same side when viewed from the control layer 14, and in radio communication performed between the memory layers 16 on the same side, the control layer 14 is not provided between the memory layers 16 that perform radio communication. In addition, a distance between the memory layers 16 becomes short because there is no control layer 14, so that efficient communication may be performed.

In the embodiment, as illustrated in FIG. 4, the plurality of blocks 30 include lines that overlap when viewed in the stacking direction. In addition, the antennas 38 are arranged along each line of the blocks 30. Thus, the antennas 38 are arranged in parallel so as to be adjacent to each other as compared with a structure in which the blocks 30 do not have lines that overlap when viewed in the stacking direction or a structure in which the antenna 38 are not arranged along each of the lines of the blocks 30. When the antennas 38 are arranged in parallel so as to be adjacent to each other, attenuation of radio waves, which is generated at the time of radio communication, is suppressed, so that radio communication may be performed efficiently.

In addition, in the embodiment, radio communication is performed between the blocks 30, so that limitations in terms of communication direction are reduced as compared with wired communication. In the embodiment, multidirectional communication may be performed as compared with wired communication, so that redundancy of the memory blocks 28 may be achieved, and reliability of the memory 12 and equipment on which the memory 12 are mounted may be improved.

The radio communication scheme in the embodiment is not limited, but inductive coupling may be used. In Table 1, for a block 30, the relationship between a control bit that is transmitted from the signal processing circuit 32 to the current direction control circuits 36 and the current direction of the antennas 38 is illustrated.

TABLE 1

| CONTROL BIT | CURRENT DIRECTION |
|---|---|
| 0 | ↓ |
| 1 | ↑ |

Figure 6A:
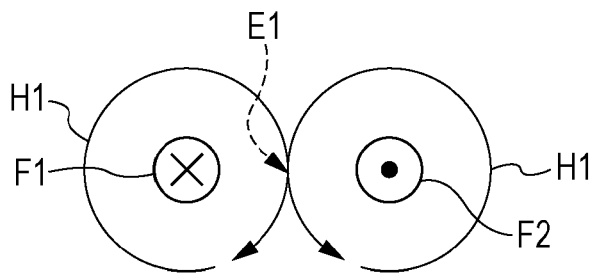
FIG. 6A is a diagram illustrating a state of communication between blocks in the memory according to the first embodiment.
Figure 6A:
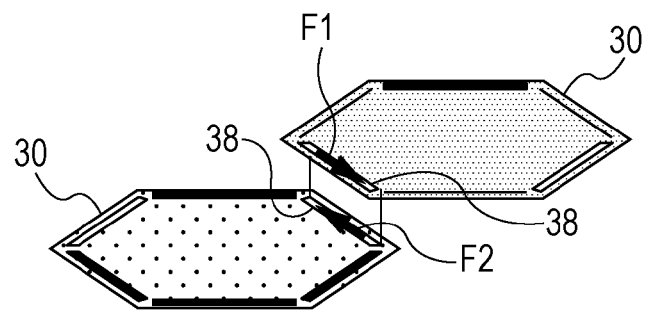
Figure 6B:
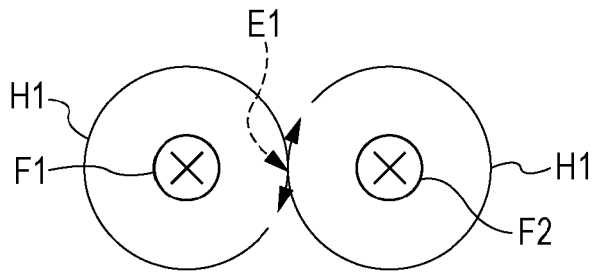
FIG. 6B is a diagram illustrating a state of communication between blocks in the memory according to the first embodiment.
Figure 6B:
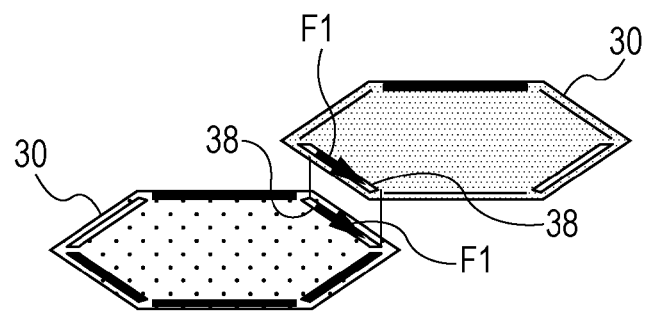

The current direction control circuits 36 control the current direction of the antennas 38 in response to the control bit from the signal processing circuit 32. For example, in Table 1, the arrow F1 direction illustrated in FIGS. 6A and 6B is set when the control bit corresponds to "0", and the arrow F2 direction illustrated in FIGS. 6A and 6B is set when the control bit corresponds to "1". That is, the current direction of the antennas 38 becomes reversed in response to the control bit.

In addition, for example, as illustrated in FIGS. 6A and 6B, when currents flow through two antennas 38 that communicate with each other, magnetic fields H1 that rotate in directions that correspond to the current directions around the antenna 38 are generated. When currents that have opposite directions flow through the two parallel antennas (see FIG. 6A), the magnetic fields that are generated by the currents enhance each other at a location E1 between the two antennas 38. On the contrary, when currents that have the same directions flow through the two antennas 38 (see FIG. 6B), the magnetic fields that are generated by the currents weaken each other at the location E1 between the two antennas 38. Using such a property, a signal may be transmitted and received between the two antennas 38. By using inductive coupling as a radio communication scheme, energy saving may be achieved.

For example, as described above, the antennas 38 are arranged so as to be adjacent to each other, thereby being advantageous to radio communication using the inductive coupling.

In addition, as illustrated in FIG. 4, in the embodiment, the control blocks 20 and the memory blocks 28 are each formed into a polygon (in the illustrated example, regular hexagon) at the same location when viewed in the stacking direction. A space is not generated in the whole memory 12 when viewed in the stacking direction, so that the control blocks 20 and the memory blocks 28 may be arranged with high density.

Regarding the shape for which a space is not generated between the blocks 30 in the stacking direction as described above, the embodiment is not limited to the above-described hexagon, and a square, rectangle, rhombus, trapezoid, triangle, or the like may be employed. The block 30 which has a hexagonal shape has more lines than a block having a triangular or quadrangular shape, therefore the number of antennas that are respectively arranged along lines also is larger. In addition, a structure may be employed in which the control layer 14 does not includes a communication block, and includes the signal processing circuit 32A, the current direction control circuit 36A and the antenna 38A. Similarly, a structure may be employed in which the memory layer 16 does not include a memory block having the above-described shape, and includes the signal processing circuit 32B, the storage area 34B, the current direction control circuit 36B, and the antenna 38B.

The embodiments that are related to the technology discussed herein are described above, but the technology discussed herein is not limited to the above-described embodiments, and various modifications can be made without departing from the spirit of the disclosure, of course, in addition to the above-described embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A memory comprising:
a control layer that includes a first radio communication unit that performs radio communication and a control unit that controls the radio communication; and
a plurality of memory layers comprising a memory layer that includes a second radio communication unit that performs the radio communication with the first radio communication unit and a first storage unit that stores information, the memory layer being provided on the control layer,
wherein the plurality of memory layers are arranged adjacently to each other and at least one of the arranged plurality of memory layers and the control layer have sides that overlap.

2. The memory according to claim 1, wherein
the control layer includes a second storage unit that stores information.

3. The memory according to claim 1, wherein
the first radio communication unit and the second radio communication unit are arranged along each of the overlapping sides.

4. A memory comprising:
a control layer that includes a first radio communication unit that performs radio communication and a control unit that controls the radio communication; and
a plurality of memory layers comprising a memory layer that includes a second radio communication unit that performs the radio communication with the first radio communication unit and a first storage unit that stores information, the memory layer being provided on the control layer,
wherein the plurality of memory layers are arranged adjacently to each other and the control layer and the memory layers respectively include a control block and a memory block that have shapes of polygons having identical two-dimensional polygonal shapes.

5. The memory according to claim 1, wherein
radio communication between the first radio communication unit and the second radio communication unit, and radio communication between the second radio communication units are performed by inductive coupling.

* * * * *